Figure 1:
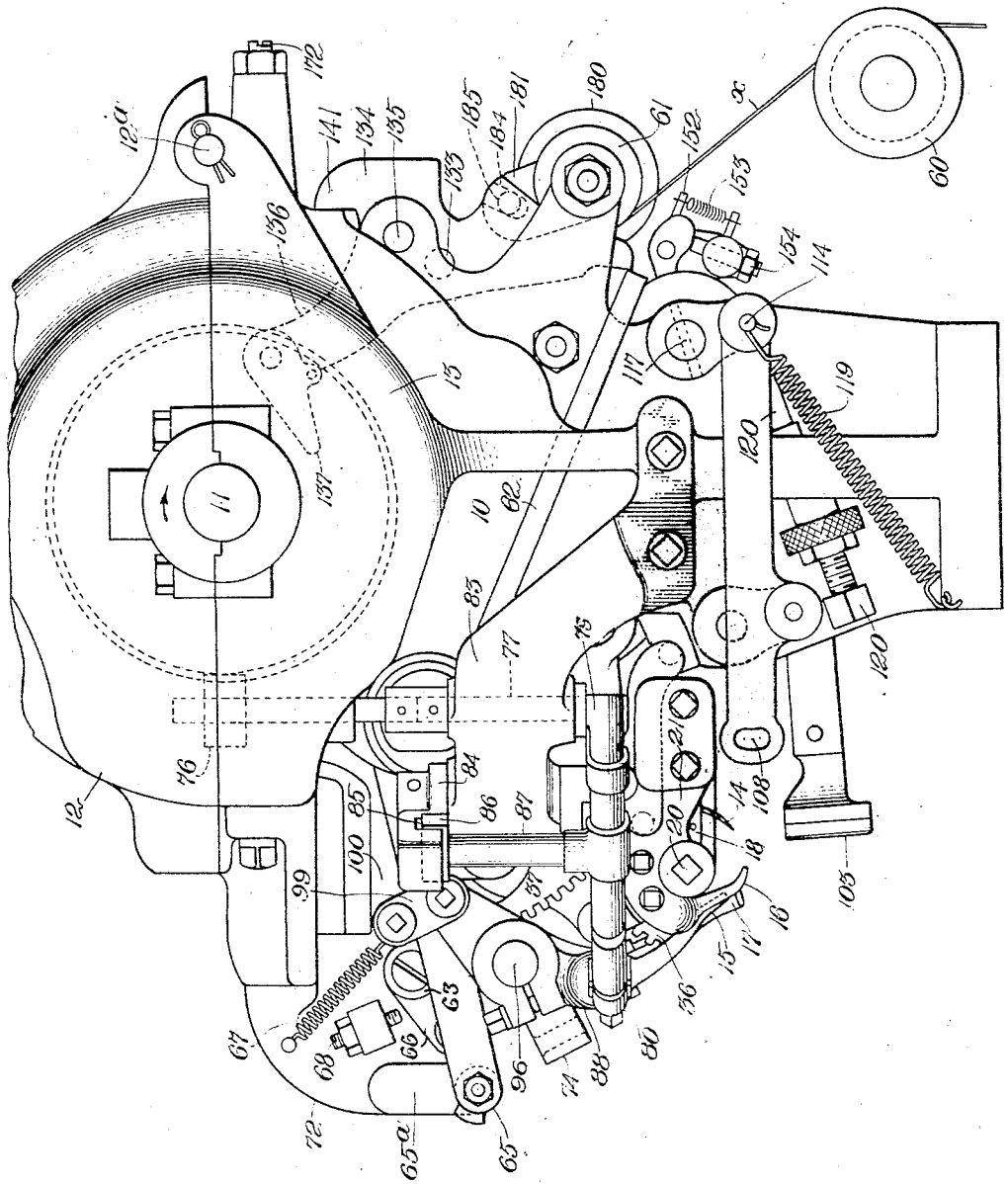

H. A. BALLARD.
WELT SEWING MACHINE.
APPLICATION FILED APR. 30, 1909.

1,125,038.

Patented Jan. 19, 1915.
7 SHEETS—SHEET 2.

Witnesses:
W. P. Abell
F. R. Ronstone

Inventor:
Harrie A. Ballard,
by Wright Brown Quinby May
Attorneys.

H. A. BALLARD.
WELT SEWING MACHINE.
APPLICATION FILED APR. 30, 1909.
1,125,038.
Patented Jan. 19, 1915.
7 SHEETS—SHEET 3.
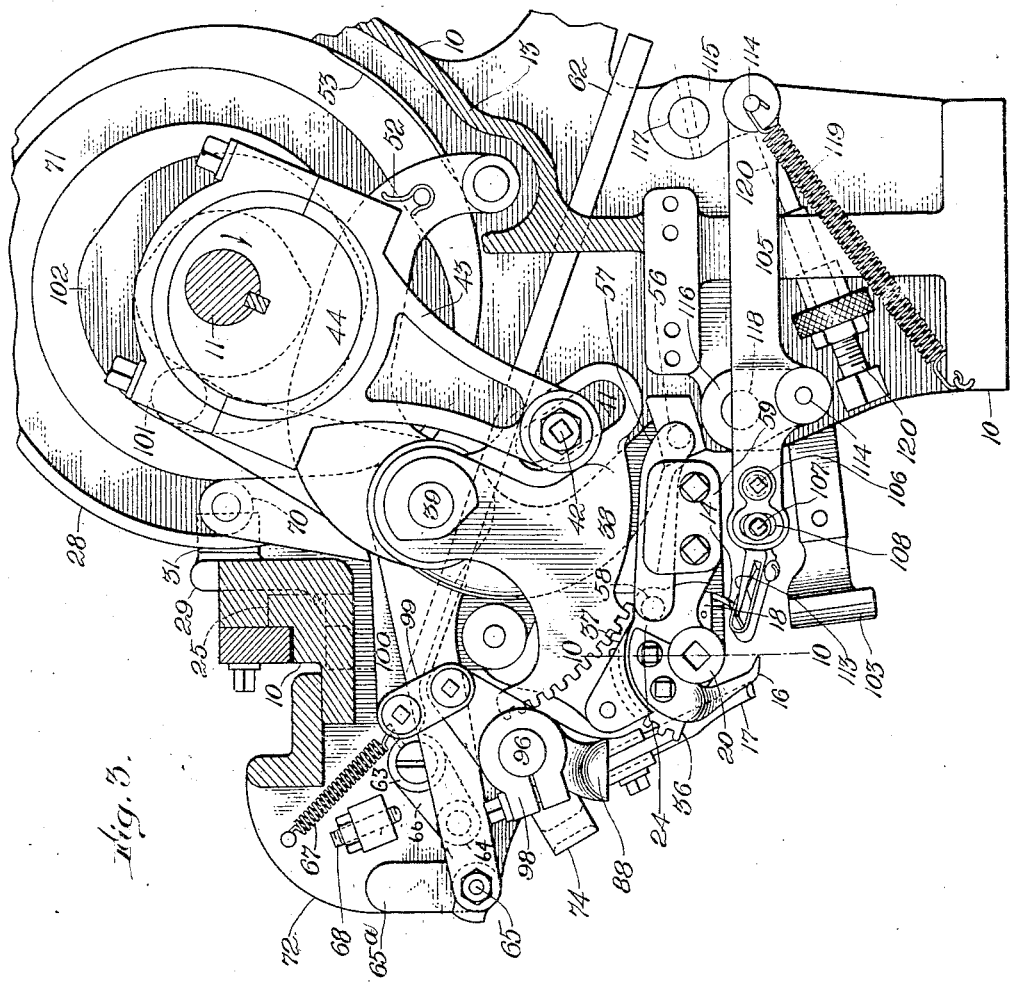
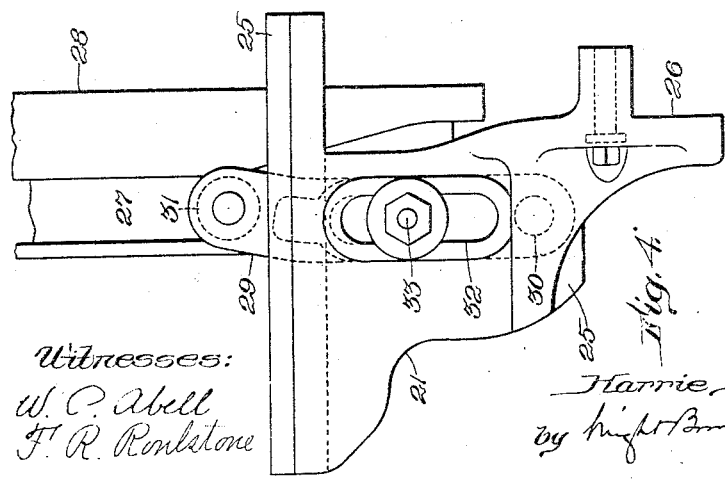
Witnesses:
W. C. Abell
F. R. Roulstone
Inventor:
Harrie A. Ballard,
by Wright Brown Quinby May
Attorneys H. A. BALLARD.
WELT SEWING MACHINE.
APPLICATION FILED APR. 30, 1909.
1,125,038.
Patented Jan. 19, 1915.
7 SHEETS—SHEET 4.
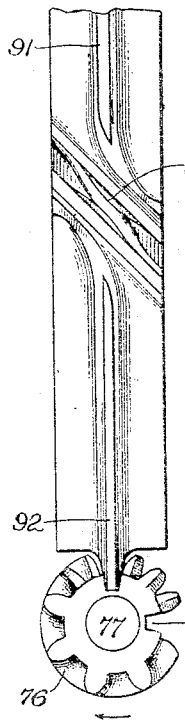
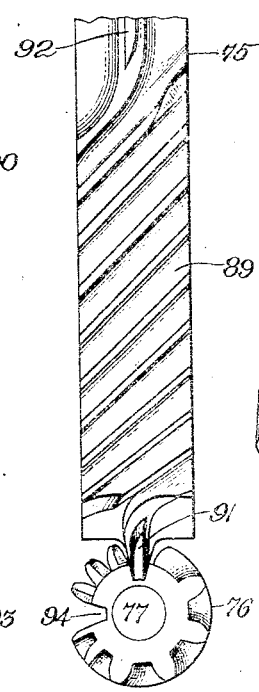
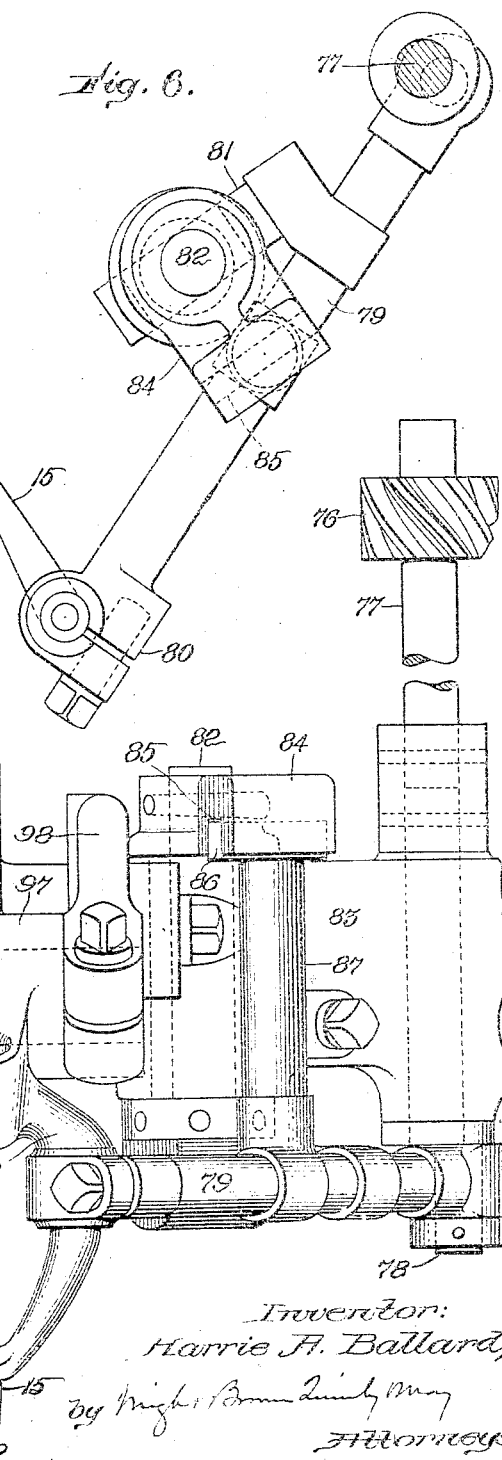
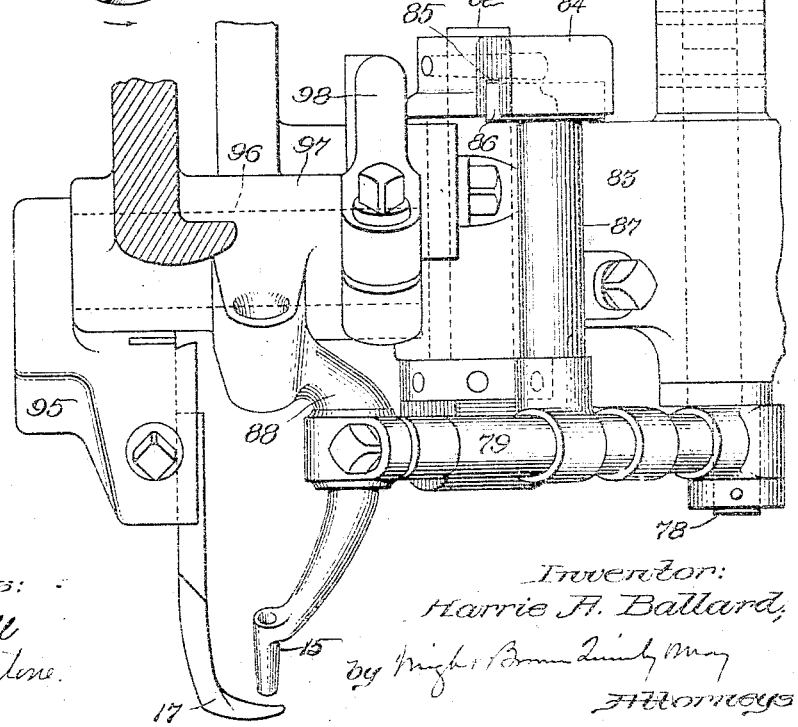

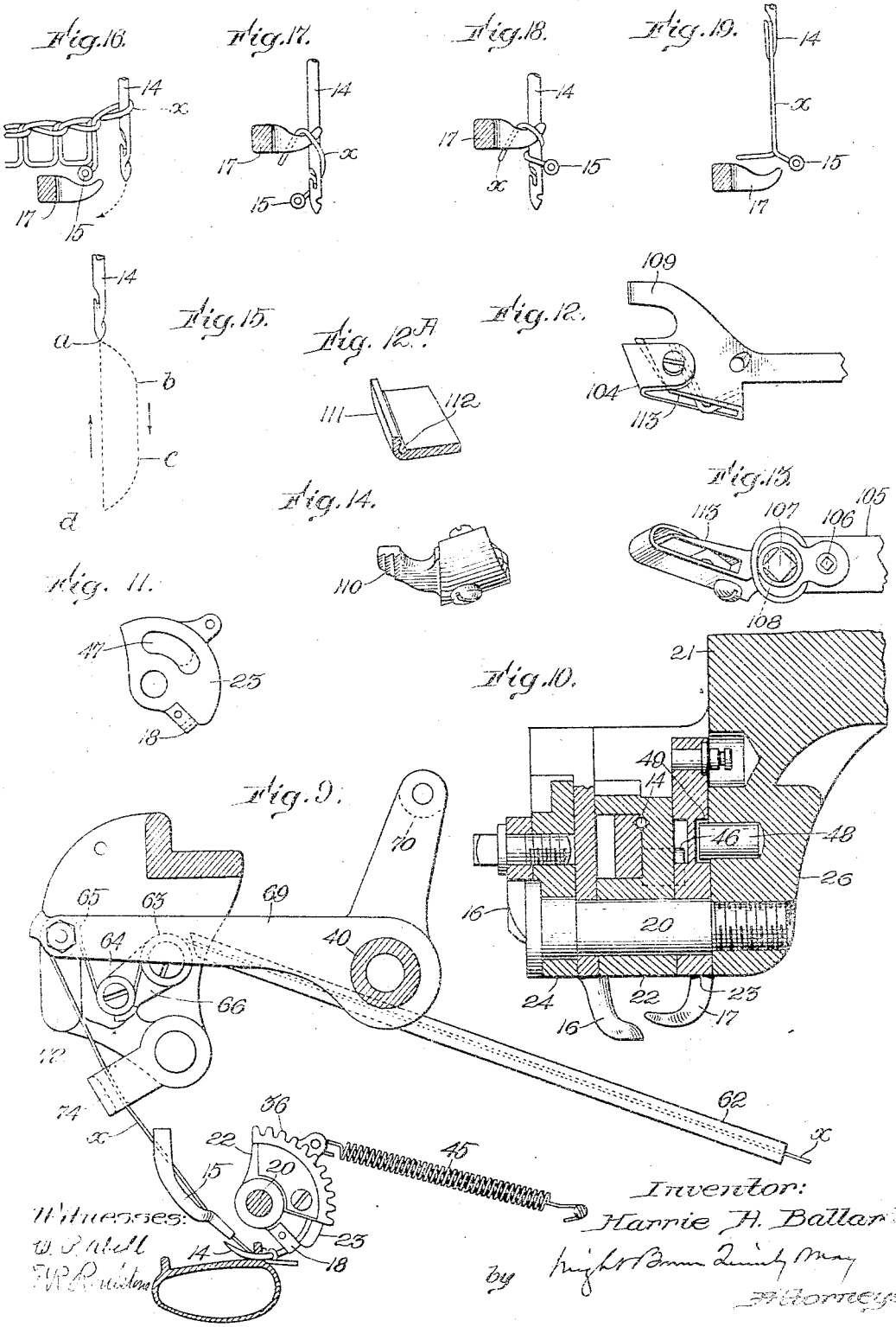

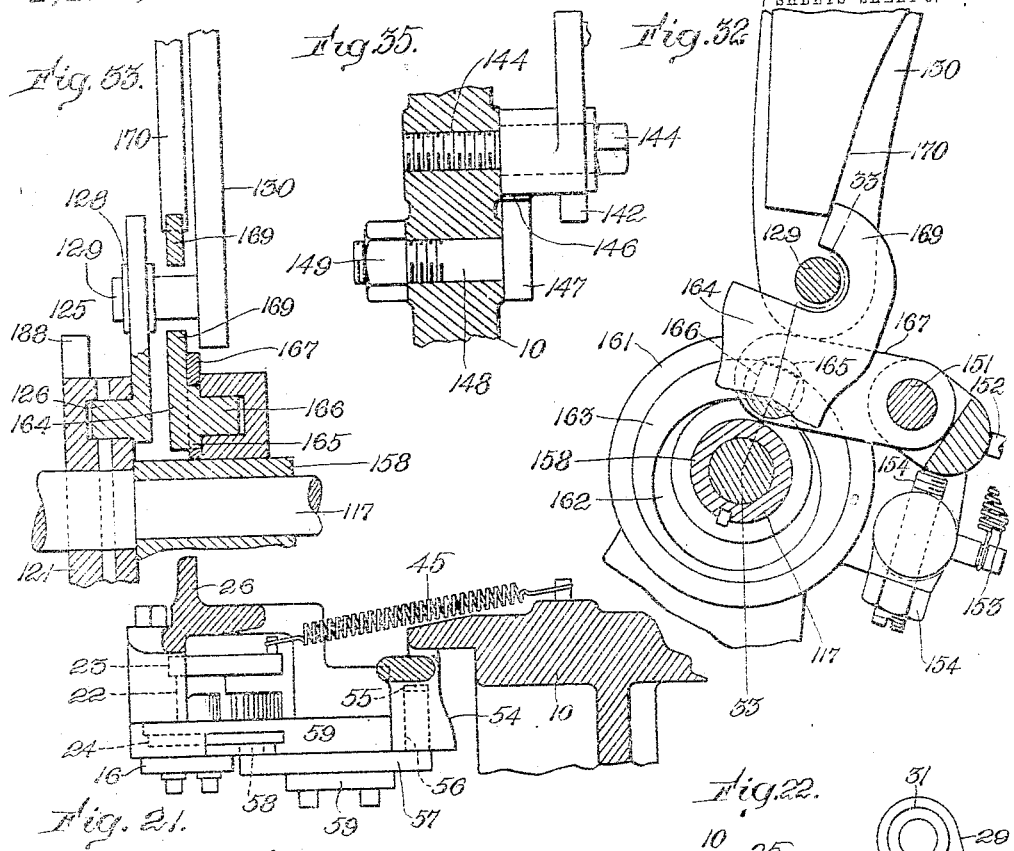
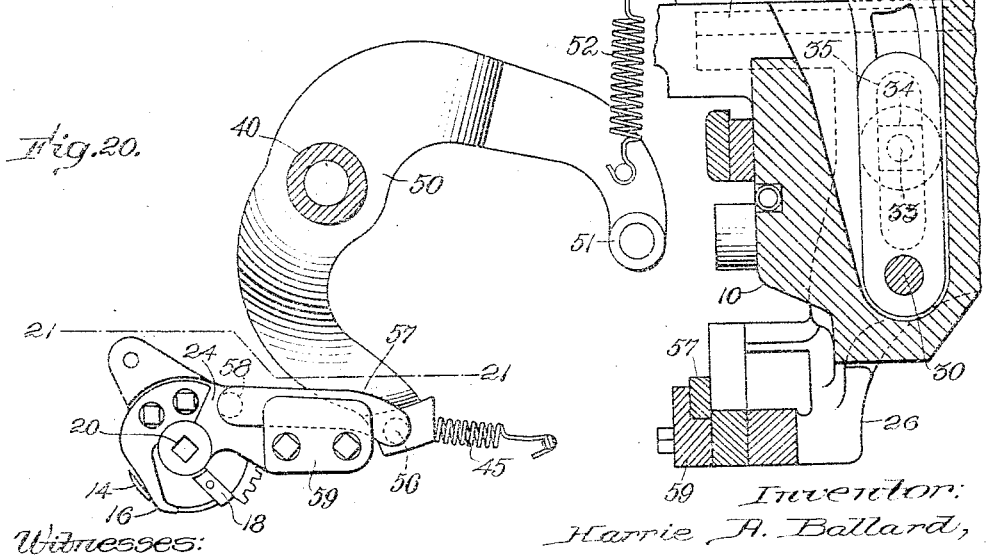

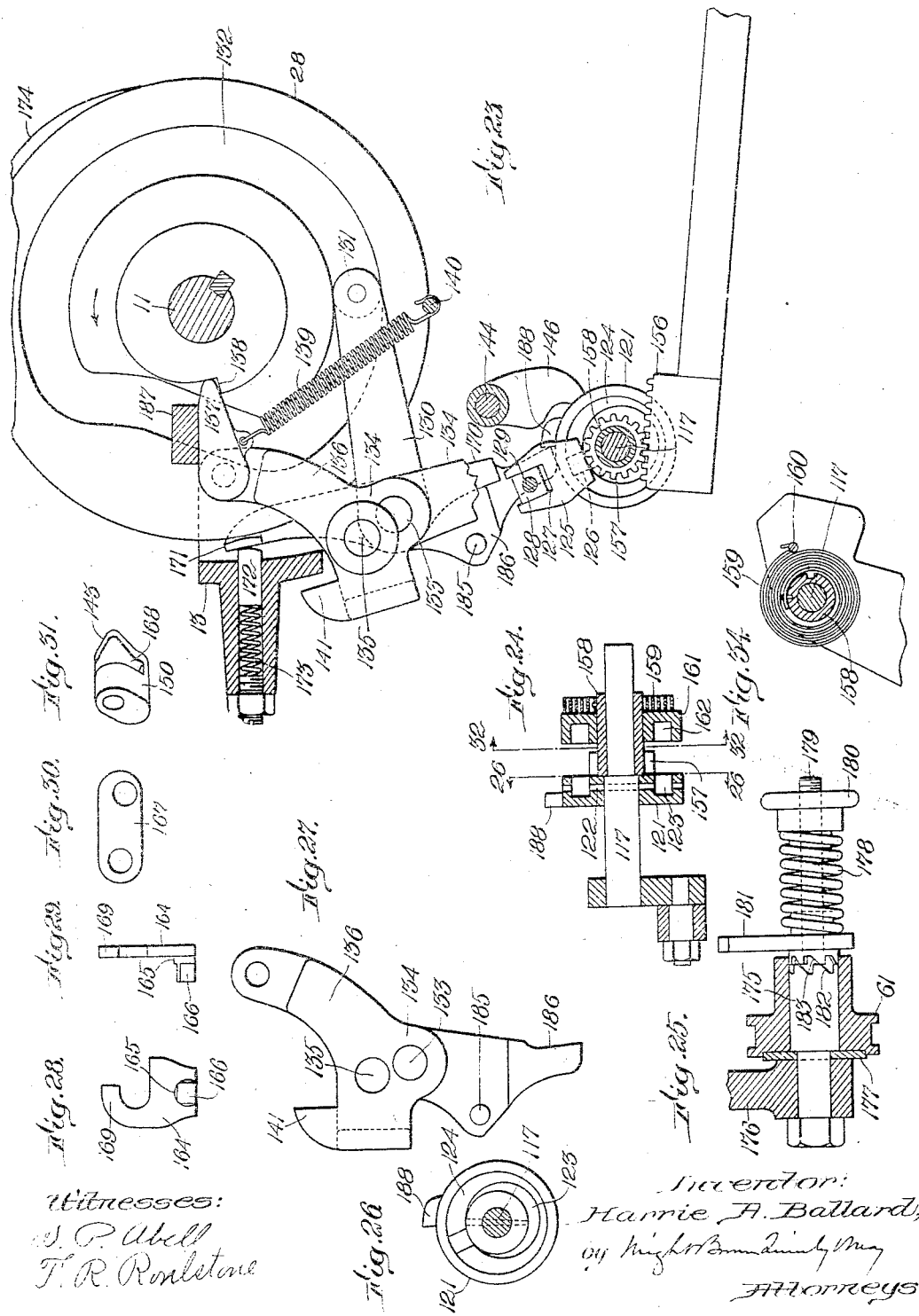

UNITED STATES PATENT OFFICE.

HARRIE A. BALLARD, OF BOSTON, MASSACHUSETTS, ASSIGNOR TO THE BOYLSTON MFG. COMPANY, OF SOUTH BOSTON, MASSACHUSETTS, A CORPORATION OF NEW JERSEY.

WELT-SEWING MACHINE.

1,125,038.  Specification of Letters Patent.  Patented Jan. 19, 1915.

Application filed April 30, 1909. Serial No. 493,208.

*To all whom it may concern:*

Be it known that I, HARRIE A. BALLARD, of Boston, in the county of Suffolk and State of Massachusetts, have invented certain new and useful Improvements in Welt-Sewing Machines, of which the following is a specification.

This invention relates to shoe-sewing machines and more especially to the type known as a "welt sewing machine", in which a curved oscillatory needle and waxed-thread are used.

The chief object of the invention is to provide mechanism of an improved character for overcoming certain objections existing in machines of this type now in general use.

A very serious and common objection in machines of this type is the vibration imparted to the work by the stitch-forming and work-feeding means. Such vibration is not only unpleasant for the operative, but handicaps the attainment of skill requisite for sewing a shoe, and often results in imperfect work.

Another common objection is found in the means for locking the work rest. The locking means is usually embodied in some form of ratchet and pawl mechanism, and, as a result, the work rest may be locked at any one of a series of predetermined positions, but not at intermediate positions. The intervals between the positions are governed by the spacing of the ratchet teeth, and consequently the work rest cannot often be positioned with accuracy.

The first of these objections is overcome by bracing and releasing the work at the appropriate intervals of time relatively to the action of the needle. A laterally movable needle is employed and it constitutes an element of the work-feeding mechanism in addition to an element of the stitch-forming mechanism. A laterally movable channel guide is employed and is actuated so as to brace the work prior to penetration by the needle and to release the work prior to retograde lateral movement.

The other objection mentioned is overcome by providing frictionally operative locking mechanism for the work rest. As a result, there are no predetermined positions at which the work rest is locked, but it may be effectually locked at any position, and is not subjected to any jar or jerk from operation of said locking mechanism.

Other improvements and their advantages are hereinafter explained and are illustrated by the accompanying drawings which show one form in which the invention may be embodied.

Figure 2:
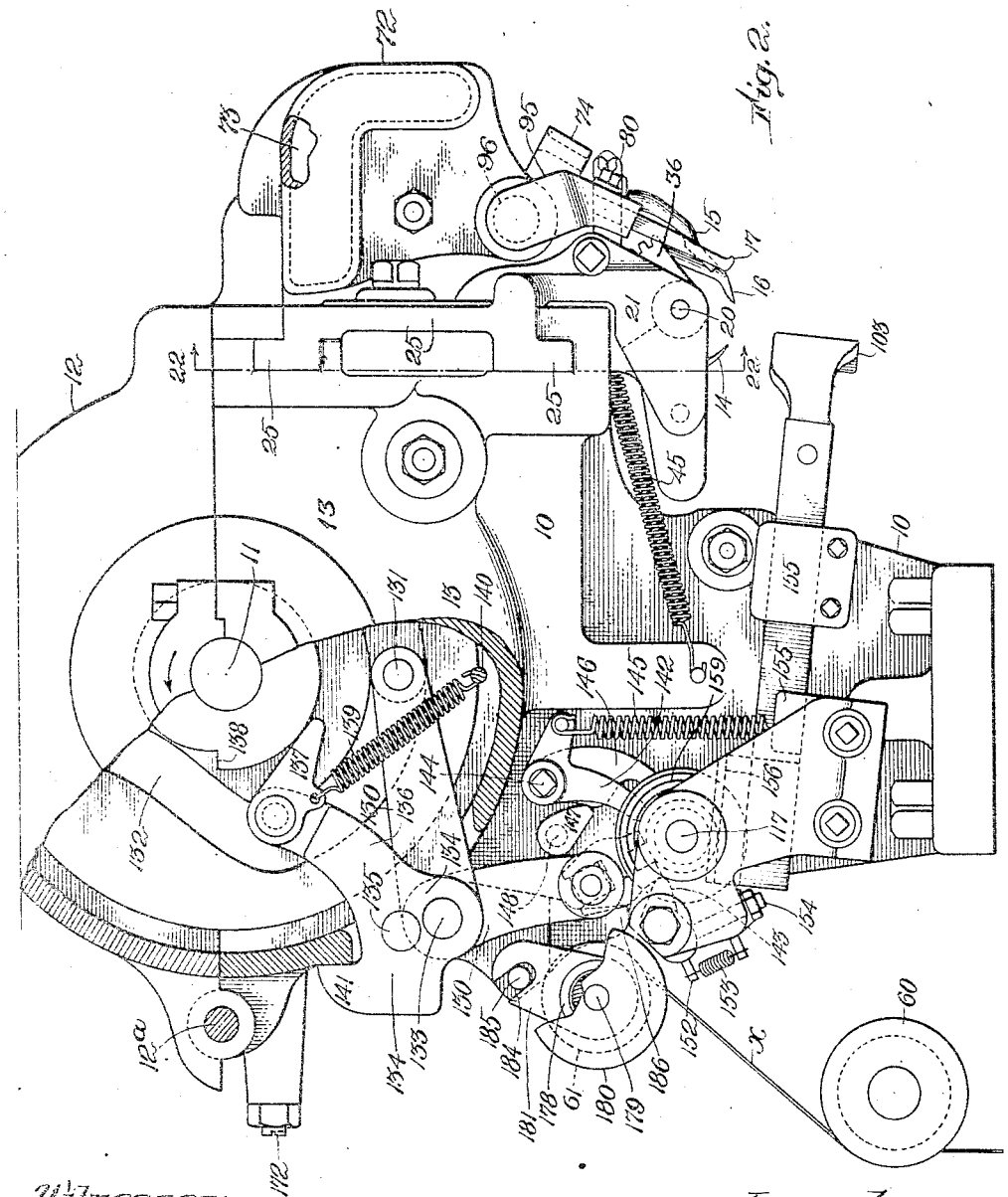

Figure 1 represents a right side elevation of the working head of a welt sewing machine. Fig. 2 is a left side elevation thereof, partly broken away. Fig. 3 is a vertical section as seen from the right-hand side. Fig. 4 is a front elevation of the work-feeding carriage and actuating mechanism therefor. Fig. 5 is a front elevation of the looper mechanism. Fig. 6 is a top plan view thereof. Figs. 7 and 8 are top plan views of portions of the looper-actuating mechanism. Fig. 9 is a right side elevation of the take-up mechanism and a portion of the stitch-forming mechanism. Fig. 10 is a section on line 10—10 of Fig. 3. Fig. 11 is a right side elevation of the needle-guide carrier. Fig. 12 is a top plan view of the welt guide. Fig. 12$^A$ is a perspective view of a fragment of a welt strip. Fig. 13 is a right side elevation of the welt guide. Fig. 14 is a front elevation thereof. Fig. 15 is a diagram of the path described by the point of the needle. Figs. 16, 17, 18 and 19 represent the needle, looper and thread finger in various positions occupied in the formation of a stitch. Fig. 20 is a right side elevation of the channel guide and its actuating mechanism. Fig. 21 is a section on line 21—21 of Fig. 20. Fig. 22 is a section on line 22—22 of Fig. 2. Fig. 23 is a left side elevation and partial section of the mechanism for actuating the work rest and welt guide. Fig. 24 is a vertical section of a portion of the friction mechanism for controlling the work rest and welt guide. Fig. 25 is a vertical section of the thread tension. Fig. 26 is a section on line 26—26 of Fig. 24. Fig. 27 is a left side elevation of a hanger shown in Fig. 23. Figs. 28 and 29 are respectively a left side elevation and front elevation of the friction controller for the work rest. Fig. 30 is a side elevation of a link for positioning the controller shown by Fig. 28. Fig. 31 is a perspective view of an adjustable stop comprising a part of the welt guide mechanism. Fig. 32 is a vertical section on line 32—32 of Fig. 24 including additional members. Fig. 33 is a section on line 33—33 of Fig. 32. Fig. 34 is a detail view of the spring for actuating the work-rest. Fig. 35 is a detail view of an adjusting device for the work-rest mechanism.

The same reference characters indicate the same parts wherever they occur.

On the drawings, 10 represents the frame of a working head of a welt shoe-sewing machine, adapted to be mounted upon a suitable base or standard not shown, and formed with bearings for a power shaft 11. The head is formed of two parts including a cap or cover 12 hinged at 12ᵃ to the main portion of the head. The two parts 10 and 12 are formed so as to provide a casing or housing 13 adapted to inclose appropriate cams and gears hereinafter described for actuating the several mechanisms. This type of machine is intended to sew with a waxed thread and is equipped with a curved oscillatory needle 14, a looper 15 for laying the thread about the needle, a movable channel guide 16, and a thread finger 17 for drawing the thread as hereinafter explained.

The needle is oscillated about an axis so as to cause it to enter and leave the work, and is also moved longitudinally of its axis for the purpose of feeding the work step by step. In order to effectually brace the needle against lateral strain when feeding the work, it is supported on opposite sides of the between substance. On the outer side of the between substance, the needle is braced by an oscillatory guide 18, and on the inner side of the between substance the needle engages the channel guide 16 and is thereby braced. In order to insure ease of operation of the needle guide and channel guide, they are all mounted so as to be movable about a common axis.

20 represents a stud mounted upon a laterally movable feed carriage 21 and adapted to support a series of three carriers indicated at 22, 23 and 24.

22 is the needle carrier.

23 is the needle-guide carrier, and 24 is the channel-guide carrier, all of which are independently movable about the stud, but which all move laterally with the stud when the feed carriage 21 is moved. The feed carriage is shown most clearly by Figs. 2, 4 and 22. It is formed with parallel flanges 25 which are arranged in suitable guides on the head 10 and is also formed with a depending arm 26 in which the stud 20 is affixed. The feed carriage receives its lateral motion from a cam 27 formed in a cam disk 28 which is affixed upon the shaft 11. Motion is transmitted from the cam 27 to the carriage by a lever 29 of which one end is pivoted upon a fixed stud 30 and of which the other end carries a roll 31 coöperating with the cam. The feed carriage is formed with a perpendicular slot 32 in which is arranged an adjustable stud 33 adapted to be clamped in any desired position in the slot. The inner end of the stud 33 is provided with a square block 34 which occupies a groove 35 formed in the lever 29. When the needle is at the left-hand extreme of its feeding stroke, the groove 35 is parallel to the slot 32, as shown by Figs. 4 and 22, and consequently the left-hand limit of the feeding strike remains constant and is not varied by adjustment of the stud 33. The length of the feeding stroke imparted to the carriage is varied by adjusting the stud toward or from the fulcrum 30, but in such case the right-hand extreme of the feeding stroke is varied.

The carriers 22, 23 and 24 all move laterally in unison with each other but are provided with separate actuators for oscillating them independently of each other about their axis 20. The needle carrier 22 is provided with spur teeth 36 in the form of a segment which intermeshes with a gear segment 37 formed upon a lever 38 pivotally mounted in the head 10 upon a fixed stud 39. The lever 38 is formed with an elongated hub or sleeve 40, see Figs. 9 and 20, for the purpose of giving it a long bearing on the stud 39. The lever 38 is formed with a radial slot 41 in which is arranged an adjustable stud 42 connecting the lever with one end of a connecting rod 43 which is mounted upon an eccentric 44 carried by the shaft 11. The rotation of the eccentric imparts oscillatory movement to the lever 38 which in turn imparts similar movement to the needle carrier. The coöperative faces of the gear segments 36 and 37 are sufficiently broad to maintain intermeshed relation regardless of the lateral movement of the segment 36 relatively to its complemental segment. The oscillatory movement imparted to the needle is so combined with the lateral movement of the feed carriage as to cause the point of the needle to move in a path of the character shown by Fig. 15. In this figure, the point of the needle is at a which is farthest remote from the work. At this point, the needle is at the end of a feeding stroke, and, upon subsequent movement of the needle toward the work, the feed carriage is given a retrograde lateral movement, which causes the point of the needle in moving from a to b to move to the right while moving toward the work. The needle, in moving from b to c, enters the between substance and emerges at the inner side thereof, still continuing to advance while the feed carriage is given a feeding movement, thus causing the needle to move from c to d. At d the eccentric 44 is passing over its dead center and consequently the needle remains practically stationary long enough to permit the looper 15 to lay a loop of thread about the barb as hereinafter explained. The needle is then retracted from $d$ to $a$ for the purpose of drawing a new loop of thread through the work. A more complete description of the stitch-forming operation is hereinafter included.

The needle-guide carrier 23, which is on the left-hand side of the needle carrier, is moved in one direction by a spring 45 and in the other direction by a stud 46 affixed to the needle carrier. The stud 46 projects into a segmental groove 47 formed in one side of the carrier 23, and a stud 48 affixed in the feed carriage arm 26 projects into a segmental groove 49 formed in the opposite face of the carrier 23. The spring 45 exerts its tension to move the needle guide 18 toward the work and a limit of movement is determined by the stud 48 engaging one end wall of the groove 49. When the needle is withdrawn from the work, the stud 46 on the needle carrier moves through the groove 47 and engaging the end wall thereof retracts the carrier 23 against the tension of the spring 45. During the first portion of the movement of the needle toward the work, the needle guide 18 moves in unison therewith until arrested by the stud 48, whereupon the needle continues to its forward extreme, and, in returning, it moves along during the first part of its movement until the carrier 23 is picked up by the stud 46, whereupon the two carriers 22 and 23 return to their remote positions in unison. One end of the spring 45 is connected to a suitable fixture in such a manner as to not interfere with the lateral movement imparted to the carrier 23.

The mechanism for oscillating the channel guide 16 is best shown by Figs. 3, 20 and 21. The actuator for the channel guide is a lever 50 which is mounted upon the sleeve 40 of the needle actuator. One end of the lever 50 carries a roll 51 which is held against the periphery of the cam disk 28 by reason of a spring 52. The periphery of the cam disk is provided with a depression 53 which coöperates with the roll 51 and enables the lever 50 to respond to the tension of the spring 52. The other end of the lever 50 is formed with a boss 54, in which is a socket 55 extending parallel to the axis of the needle stud 20. The socket 55 is occupied by a pin 56 formed upon one end of a link or strap 57 which has a shorter pin 58 at its other end. The pin 58 is also parallel to the axis of the needle stud and is pivotally connected with the channel-guide carrier 24. Oscillatory movement, imparted to the lever 50, causes the link 57 to move back and forth and thus to oscillate the channel guide about its axis 20. The channel guide, however, moves laterally with the feed carriage, whereas the lever 50 is not laterally movable. The link 57 also moves laterally with the channel guide and is confined between guides 59, which cause the pin 56 to move in and out of the socket 55 with a telescopic action. The link 57, by reason of this connection, is adapted to be moved back and forth to oscillate the channel guide regardless of the lateral movement of the feed carriage.

The thread, which is indicated at $x$, is drawn from any suitable source of supply, preferably at the rear of the machine, and after being immersed in wax, passes over a roll 60 to a tension roll 61 about which it may be given any desired number of convolutions. The thread leaving the tension roll 61 passes to a suitable take-up, and, for the purpose of protecting and guiding it toward the take-up, it may be passed through a tube 62 affixed in the head 10.

Referring now to Fig. 9, the thread, after leaving the upper end of the tube 62, passes over a stationary guide-roll 63, over a spring-actuated take-up roll 64, and over a positively actuated take-up roll 65. The roll 63 is mounted upon the fulcrum of an arm 66 which carries the roll 64 and which is subject to the tension of a spring 67. 68 is an adjustable stop screw for limiting the movement of the arm 66 when the latter is moved against the tension of its spring. The roll 65 is mounted on the free end of a bell crank lever 69 which is mounted upon the sleeve or hub 40 of the needle actuator, and which has at its other end a cam roll 70 which occupies a cam groove 71 formed in the disk 28. The roll 65, at the free end of the arm 69, has a wiping contact with a heating surface 65ª which is formed upon a bracket 72 containing a steam-heating chamber 73 (see Fig. 2). The thread, in passing from the roll 65 to the work, passes first through a fixed guide 74 and then through the looper 15. The thread guide 74 is also formed upon the steam-heated bracket and assists in keeping the waxed thread in a heated state while approaching the work. The looper 15 is also heated for the same purpose as hereinafter explained.

The looper mechanism is similar to the looper mechanism illustrated and described in my co-pending application filed December 26, 1907, Serial No. 408,034, and comprises a nozzle which describes a circular movement and which is actuated intermittently so as to cause it to move first in one direction through approximately one and one-quarter revolutions, and then in the opposite direction through one-quarter of a revolution to its initial position. The looper receives its motion from a pair of mutilated spiral gears 75 and 76, of which the former is keyed upon the shaft 11. The gear 76 is affixed at the upper end of an upright shaft 77 as shown by Figs. 1 and 5. The lower end of the shaft 77 is provided with a crank pin 78 which is embraced by one end of a rod 79. The other end of the rod 79 is formed with a split clamp 80 in which the upper end of the looper 15 is secured. The rod 79 has affixed to it a shorter rod 81 which has a sliding fit in a swiveled stud 82.

The stud 82 is journaled in a bracket 83 affixed to the head 10 and has at its upper end an arm 84 pinned or otherwise affixed.
The arm 84 is formed with a groove 85 which is parallel to the rod 81. The groove 85 is occupied by an elongated head 86 at the upper end of a stem 87 affixed to the rod 79. When the shaft 77 is revolved, the movement of the crank pin 78 causes the looper carrier 79 to move forward and back and at the same time to oscillate about the axis of the swiveled stud 82. The head 86 moves longitudinally in the groove 85 and assists in steadying the rod 79 so as to prevent it from turning on its axis. The movement imparted to the nozzle of the looper 15 is approximately the opposite of the movement of the crank pin 78. The forward end of the looper carrier 79 and the upper end of the looper shank clamped therein bear against the under side of a nose 88 projecting from the thread guide 74. The nose 88, when heated, tends to keep the looper sufficiently heated to preserve the wax on the thread in a soft state when it is presented to the needle.

The spiral gear 75, which turns with the shaft 11, is formed with a relatively long series of teeth 89 inclined in one direction and a relatively short series of teeth 90 inclined in the opposite direction. The intervals between the series 89 and 90 are occupied by segmental ribs 91 92 which are adapted to coöperate with grooves 93 and 94 formed in the gear 76. The gear 76 is formed with a relatively long series of teeth adapted to intermesh with the teeth 89 and with a relatively short series of cross-cut teeth adapted to intermesh with both of the series 89 and 90. The number of teeth in the series 89 is sufficient to revolve the gear 76 through one and one-quarter revolutions in one direction, and the number of teeth in the series 90 is sufficient to revolve the gear 76 through one-quarter of a revolution in the opposite direction, and thus restore the gear 76 to its initial position once for each revolution of the gear 75.
The thread finger 17, whose function is hereinafter explained, is adjustably clamped in a holder 95 which is formed with a stud 96 journaled in a boss 97 on the steam-heated bracket 72. On one end of the stud 96 is clamped an arm 98 whose free end is connected by a pivoted link 99 to an actuator 100 (see Figs. 1 and 3). The actuator 100 is in form a bell crank lever and is fulcrumed upon the hub or sleeve 40 of the needle actuator in the same manner as the channel-guide actuator 50 and the take-up arm 69. The other end of the actuator 100 is provided with a roll 101 which occupies a cam groove 102 formed in the disk 28.
By this means, the thread finger is oscillated intermittently so as to cause it to engage the thread x between the looper and the needle, and to draw the thread toward the rear and to subsequently move to the front so as to give up to the needle the thread previously drawn.

*Stitch-forming and work-feeding operation.*—When the needle is in the position shown by Figs. 15 and 19, it is withdrawn from the work to its most remote position. As it advances to the work, it moves to the right so as to penetrate the work at a new point preparatory to feeding the work. At this time, the thread finger is in its forward position and is disengaged from the thread. The channel guide 16, up to this point, is in operative engagement with the work but is retracted so as to release the work immediately prior to the movement of the needle from a to b, see Fig. 15. By reason of so releasing the work, the channel guide is enabled to move laterally with the needle in order to engage the work at a new point without liability of moving the work laterally or of disarranging or jerking the work. When the needle arrives at b, it is about to enter the work and at this point the channel guide is again actuated so as to operatively engage the work prior to penetration by the needle. Thus the work is sufficiently braced by the channel guide which has a very slight oscillatory movement prior to the penetration by the needle, and the work is therefore not subject to jerking when the needle enters. The needle, in passing from b to c, penetrates the work and emerges at the inner side of the between substance, as shown by Fig. 16, and continues to advance during the feeding movement of the carriage which causes the needle to move laterally from c to d. During the movement from c to d, the several parts move from the position shown by Fig. 16 to the position shown by Fig. 17. While the needle is moving to the left, the looper moves to the right describing a clockwise movement about the end of the needle so as to lay the thread about the barb. At the same time the thread finger 17 moves from front to rear, thereby engaging the thread between the looper and the needle and drawing it to the position shown by Fig. 17. The looper continues to move until it reaches the position shown by Fig. 18, at which time it has completed one and one-quarter revolutions about the needle. Meanwhile the needle starts back at first slowly and the thread finger 17 moves forward, thus giving up its thread to the needle so that the needle may draw a newly formed loop backward through the work without imposing undue tension upon the thread. At the completion of the backward movement of the needle, the several parts occupy their initial positions after having completed one cycle of movements.

The machine is equipped with a suitable work rest 103 which is movable from front to rear and which is subject to spring tension tending to move it forward, and which is intermittently locked and released with relation to the feeding movement of the work as hereinafter explained. The machine is also equipped with a welt guide 104 which is mounted and actuated so as to move in an arc concentric to the axis 20 of the needle. The welt guide (see Figs. 3, 12, 13 and 14) is adjustably mounted on the forward end of an oscillatory carrier 105. It is connected to the carrier by a pivot stud 106 and by an adjustable clamping stud 107 which is adapted to be clamped in any desired position in a slot 108 formed in the end of the carrier. The welt guide is adapted to engage a shoe on the right-hand side of the needle and is formed with a hooked finger 109 which extends back of the needle and toward the work so as to engage the work on the opposite side of the needle. The under face of the finger 109 is provided with teeth 110 (see Fig. 14) which are adapted to prevent the work from moving from left to right, the feeding movement of the work being from right to left. Fig. 12A shows a fragment of a welt strip 111 adapted to be sewed to the shoe and it is adapted to pass through the throat formed in the welt guide for its reception. The welt strip is formed with a groove 112 for the reception of the stitches and the welt guide 104 is provided with a plate 113 whose forward edge is adapted to occupy the groove 112 and guide the welt in accurate relation to the shoe.

The carrier 105 is mounted by two pivots 114 upon a pair of oscillatory arms 115 and 116 mounted respectively upon a rock shaft 117 and a stationary stud 118. By reason of so mounting the carrier 105, it is adapted to receive an oscillatory motion similar to that of a swinging parallel ruler, and the radius of the pivots 114 relatively to the fulcra 117 118 is equal to the radius of the needle 14, thus insuring movement of the welt guide in an arc which is not only concentric to the axis of the needle, but which is of an equal radius to that of the needle. The welt guide is so adjusted that the groove 112 in the welt strip is positioned in the path of the needle, thus insuring accuracy in causing the point of the needle to penetrate the welt strip in the groove 112 in every case. The carrier 105 is subject to the tension of a spring 119 which tends to move the welt guide toward the work. The rock shaft 117 is alternately locked and oscillated, as hereinafter explained, to lock the welt guide and move it from the work. 120 is an adjustable stop screw-threaded in a web of the head 10 and arranged in the path of the free end of the arm 115 so as to limit the movement of the arm toward the work.

Referring now to Fig. 24, which shows a rear section of the members connected with the rock shaft 117, it will be seen that the shaft is provided with a disk 121 affixed to the shaft by a pin 122. The disk 121, hereinafter termed the friction drum, is formed with an annular groove 123 which is adapted to contain a split friction ring 124 (see Figs. 23 and 26). The split ring 124 normally tends to free itself from the friction drum but its ends are adapted to be separated so as to expand it against the outer flange of the drum. In Figs. 23 and 33 is shown a member 125 which is hereinafter termed a controller. The controller is in the form of a plate having a square boss 126 adapted to occupy the groove 123 between the ends of the split ring 124, and, when turned about the axis of the boss, is adapted to expand the ring so as to cause it to frictionally engage the flange of the drum 121. The plate is formed with a radial slot 127 which is occupied by a sliding block 128 mounted upon a stud 129 carried at the free end of an actuator 130. The actuator has the form of a bell-crank lever at the other end of which is a cam roll 131 coöperating with a cam groove 132 formed in the disk 28. The fulcrum of the actuator 130 is a stud 133 mounted in a movable hanger 134. The hanger 134 in practice remains stationary while the shaft 11 is in the forward drive, as indicated by the arrows in Figs. 1, 2, 3 and 23, but is adapted to be actuated only when the shaft is turned in the opposite direction as hereinafter explained. It is pivotally connected to ears on the head 10 by a stud 135 and it is provided with an arm 136 projecting into the casing 13 and having at its inner end a pawl 137 adapted to coöperate with a shoulder 138 formed upon the hub of the cam disk 28. A spring 139, connected to the pawl 137 and to a fixed pin 140, exerts its tension to hold the free end of the pawl against the hub of the cam disk and also to move the arm 136 forward so as to cause a stop projection 141 to engage the exterior of the casing 13 as shown by Fig. 2. In this position the hanger 134 remains at all times excepting when the shaft 11 is turned in the opposite direction.

The oscillation imparted to the actuator 130

130 causes the controller 125 to swing back and forth about the rock shaft 117 carrying with it the normally loose split ring 124. In order to cause the controller 125 to turn about the axis of the boss 126, a pair of stops 142 and 143 is arranged in its path, one on either side. The two stops are adjustable for the purpose of providing more or less space between them in which the controller may travel without opposition.

The stop 142 is in the form of a bell-crank lever and is mounted upon a stud 144 projecting from the frame 10 and is subject to the tension of a spring 145 which tends to move the stop toward the controller. The stop, however, is provided with another finger 146 which is adapted to engage the periphery of the drum 121, as shown by Figs. 2 and 23, and so to limit the movement of the stop toward the controller. The position of the stop may be adjusted by means of a cam 147 formed upon one end of a stud 148 having a bearing in the frame 10 and adapted to be set at any desired position and clamped. The cam is adapted to engage one edge of the finger 146 and hold it in various positions against the tension of the spring 145. For the purpose of clamping the stud 148, it may be formed with a screw thread at its other end and provided with a clamping nut 149.

The stop 143 (see Fig. 31) is formed upon an adjustable block 150 pivotally mounted upon a stud 151 (see Fig. 32). The block 150 is provided with a pin 152 which is engaged by a spring 153 exerting its tension so as to tilt the block and cause the stop 143 to move toward the controller 125. The position of the stop 143 is adjusted and determined by an adjustable stop screw 154 which holds the block 150 against the tension of the spring.

The operation of the controller 125 is as follows: For example, if the stops 142 and 143 are so far apart as to be beyond the range of movement of the controller, they are not effective in causing the controller to turn about the axis of the boss 126 and consequently the controller and split ring 124 oscillate freely with relation to the drum 121. If, on the other hand, the stops are adjusted so as to lie within the range of movement of the controller, movement of the lower end of the latter is arrested by engagement with either stop. Inasmuch as the upper end of the controller receives a predetermined movement for each oscillation of the actuator 130, the upper end of the controller continues to move after the lower end is arrested by either of the stops. Thus it is apparent that the split ring 124 is expanded by movement of the free end of the controller relatively to the boss 126 and that continued movement of the free end of the controller causes the expanded ring and the drum to revolve. In this way, movement is imparted to the rock shaft 117 for the purpose of actuating the welt guide. The tension of the spring 145, while sufficient to arrest the movement of the controller for the purpose of expanding the ring 124, permits deflection of the stop 142 while the controller 125 continues to move after having expanded the ring 124. The stop 143 is adapted to yield in the same manner as the stop 142, the spring tension in each case being sufficient merely to cause a rocking of the controller about the axis of its square boss.

The stops are preferably adjusted so as to cause coöperative engagement of the ring 124 when the welt guide is in position to engage a shoe, and to release the welt guide immediately upon reverse movement of the actuator 130 and to again cause the ring 124 to coöperatively engage the drum 121 so as to retract the welt guide. It will be obvious that the controller is rocked in both directions from a median radial position during its movement from one stop to the other, and that, in each case, the ring 124 is permitted to assume its normally free position when the controller is at its median position.

The work rest 103, which as hereinbefore stated, is movable toward and from the work and is normally held toward the work by spring tension, is formed upon one end of a longitudinally movable bar mounted so as to slide in guides 155 (see Fig. 2). The rear end of the work rest is provided with a gear rack 156 (see Fig. 23), which intermeshes with a pinion 157 formed upon one end of a sleeve 158 loosely mounted upon the rock shaft 117. The movements imparted to the rock shaft and to the sleeve 158 are entirely independent of each other and in no way conflict. The other end of the sleeve 158 (see Figs. 24 and 34) is connected to one end of a clock spring 159 whose other end is attached to a fixed pin 160. The spring exerts its tension to turn the sleeve and the pinion so as to project the work rest toward the work. The sleeve 158 is further provided with a friction drum 161 similar to the drum 121 for actuating the welt guide. The drum 161 is keyed or otherwise affixed to the sleeve 158 and is formed with an annular groove 162 which is occupied by a split ring 163 (see Fig. 32). The ring 163 is in all respects like the ring 124 and is adapted to be expanded in the same way. For this purpose, a second controller 164 is provided (see Figs. 28 and 29).

The controller 164 is formed with a boss which has a cylindrical portion 165 and a square portion 166, the latter portion being adapted to engage and expand the ends of the ring 163. Unlike the controller 125, however, the controller 164 is not permitted to oscillate about the axis of the shaft 117, but is confined at all times to oscillation about the axis of the square boss. For this purpose, a pivoted link or strap 167 is provided (see Figs. 30, 32 and 33). One end of the strap 167 embraces the cylindrical portion 165 and the other end occupies a saw slot 168 formed in the block 150 and embraces the stud 151, as shown by Fig. 32. The controller 164, unlike the controller 125, is not formed with a radial slot, but is formed with a hooked finger 169 which extends partially around the stud 129 carried at the free end of the actuator 130. The reason for so forming the controller 164 is to adapt it to be engaged by an actuator 170 and at the same time to avoid the stud 129.

The actuator 170 is a lever mounted upon the same stud 133 as the actuator 130, and its upper end (see Fig. 23) is formed with a lip 171 overlapping the periphery of the cam disk 28. The lip is held toward the cam disk by a spring follower 172 contained in a socket formed on the exterior of the casing 13. The follower is actuated by a spring 173 and it is this tension of the spring which causes coöperative engagement of the lower end of the actuator with the finger 169, thus causing an expansion of the split ring 163. The boss of the controller 164 being held positively by the strap 167, prevents the turning of the drum 161 when the ring is expanded and in this way the work rest is effectually locked against all movement. The lip 171 is prevented by the coöperative engagement of the actuator 170 with the finger 169 from actually engaging the disk 128, but, when the disk is in motion, the actuator 170 is periodically retracted against the tension of the spring follower by a cam shoulder 174 which engages the inner side of the lip 171. By this means, the controller 164 is caused by the tension of the spring 173, to lock the work rest, and when the cam shoulder 174 retracts the actuator, the split ring 163 is permitted to assume its normally free position. The retraction of the actuator 170 is preferably timed so as to release the work rest immediately prior to the feeding movement of the work, and to lock the work rest at the completion of the feeding movement, and to hold it in locked position until the next feeding movement.

Fig. 25 illustrates in detail the construction of the thread tension. The tension roll 61 is located in the rear of the friction mechanism for controlling the welt guide and work rest and is loosely mounted upon a stud 175 extending laterally from a bracket 176. A friction disk 177 is interposed between the bracket and the tension roll and the latter is adapted to be forced against the friction disk by the action of a spring 178.

The spring is coiled about a screw-threaded stem 179 extending from the stud 175 and provided with an adjusting nut 180 engaging one end of the spring. A lever 181 is mounted upon the stem 179 and is interposed between the spring and the stud 175, and is adapted to frictionally engage the end of the hub formed on the tension roll. The end of the stud 175 is formed with inclined teeth 182 which are adapted to coöperate with similar teeth 183 formed upon the adjacent face of the hub of the lever 181. The coöperative teeth are prevented from being seated upon each other when the lever 181 is in its normal position by reason of the frictional engagement of the lever with the hub of the tension roll. In this way the full tension of the spring 178 may be exerted upon the tension roll which is compressed between the lever and the friction disk 177. By reason of this friction, the thread, which may be given any desired number of convolutions about the roll, may be subjected to tension which may be varied by the nut 180. The lever 181 however is adapted to be oscillated so as to cause the coöperative teeth 182 and 183 to displace the lever axially and release the thread roll, as shown by Fig. 25. When the lever is in this position, the full tension of the spring 178 is supported by the teeth 182 and the thread roll is free to turn. The free end of the lever 181 is formed with an indentation 184 (see Fig. 2). The indentation is occupied by a stud 185 carried by a depending arm 186 formed upon the hanger 134. When the shaft 11 is in the forward drive, the hanger 134 is held in the position shown by Fig. 2, thus enabling the lever 181 to coöperatively engage the hub of the thread roll, but, when the shaft is reversed, it causes oscillatory movement of the hanger and of the lever 181, thus releasing the tension upon the thread roll. When the shaft 11 is reversed, the shoulder 138 engages the end of the pawl 137, thereby retracting the pawl and the arm 136 against the tension of the spring 139 so far as to cause the pawl to engage a fixed stop 187 (see Fig. 23). This stop limits the backward movement of the shaft, and in this position the stud 185 causes the release of the thread tension. At the same time the fulcrum stud 133 of the actuator 170 is moved forward, thereby causing the actuator to release the work rest. Furthermore the lower end of the arm 186 engages a lug 188 on the drum 121 thereby retracting the welt guide, and at this time the needle 14 is retracted to its remote position, the shoe is released by movement of the channel guide 16, and the work is thus entirely freed so that it may be withdrawn from the machine before severing the thread.

Having thus explained the nature of my said invention and described a way of constructing and using the same, although without attempting to set forth all of the forms in which it may be made or all of the modes of its use, I declare that what I claim is:—

1. In a shoe-sewing machine, stitch-forming mechanism including a needle, a channel guide, and means arranged to move said needle and channel guide laterally to feed the work, said channel guide being arranged to engage the needle during such feeding movement to brace the needle against lateral stress due to feeding.

2. In a shoe-sewing machine, stitch-forming mechanism including a needle, a channel guide, said needle being arranged to enter the between substance from the side opposite said channel guide, and means arranged to move said needle and channel guide laterally in unison to feed the work, said channel guide being arranged to engage the needle in the channel of the insole to brace the needle against the lateral stress due to feeding.

3. In a shoe sewing machine, stitch forming mechanism comprising a needle, means for actuating the needle, a laterally movable oscillatory carrier, means on said carrier for engaging the work to resist the thrust of the needle, a reciprocatory member for causing said work-engaging means to oppose the thrust of the needle, and means connecting said carrier and said reciprocatory member for oscillating the carrier, said connecting means being laterally movable with the carrier and having telescopic pin and socket connection with said reciprocatory member.

4. In a welt shoe-sewing machine, work-feeding means comprising a curved oscillatory needle, an oscillatory channel guide, said needle and channel guide being also movable laterally to feed the work, means for moving them laterally, means for oscillating the needle, and means for oscillating the channel guide to cause it to operatively engage the work prior to engagement of the work by the needle and to release the work at the end of the retractory movement of the needle and prior to the next succeeding lateral movement thereof; a movable back rest for the work, and means for actuating the back rest whereby it is caused to engage the work at the end of the feeding movement and to coöperate with the channel guide to clamp the work during the retractory movement of the needle.

5. In a welt shoe-sewing machine, a power shaft, a needle and actuator therefor, a channel guide and actuator, a normally active thread tension, a yielding work-rest and locking mechanism therefor, and a yielding welt guide and actuating mechanism therefor, all organized so as to be actuated by a partial backward revolution of the shaft with the effect of simultaneously retracting the needle, channel guide, and welt guide, and of releasing the thread and the work-rest.

6. In a shoe-sewing machine, a reciprocatory feed carriage, a channel guide pivotally mounted thereon so as to move therewith, an actuator, and means arranged to transmit motion from said actuator to oscillate said channel guide, said means being arranged upon and movable laterally with said carriage and having telescopic pin-and-socket connection with said actuator parallel to the line of feeding movement.

7. In a shoe-sewing machine, stitch-forming mechanism including a needle, a member arranged to engage the between substance to brace the same against the stress due to longitudinal movement of the needle, said member being movable toward and from the between substance, means arranged to move said needle and member laterally to feed the work, an actuating member, and means arranged to transmit motion from said actuating member to said work-engaging member, the last-mentioned means having telescopic pin-and-socket connection with one of said members parallel to the line of feeding movement.

In testimony whereof I have affixed my signature, in presence of two witnesses.

HARRIE A. BALLARD.

Witnesses:
W. P. ABELL,
P. W. PEZZETTI.